United States Patent
Bijoy et al.

(10) Patent No.: US 9,483,331 B1
(45) Date of Patent: Nov. 1, 2016

(54) NOTIFYING A MULTIPATHING DRIVER OF FABRIC EVENTS AND PERFORMING MULTIPATHING MANAGEMENT OPERATIONS IN RESPONSE TO SUCH FABRIC EVENTS

(71) Applicant: EMC Corporation, Hopkinton, MA (US)

(72) Inventors: Savitha S. Bijoy, Bangalore (IN); Ajith Balakrishnan, Bangalore (IN); Helen S. Raizen, Jamaica Plain, MA (US); Raghuram Adabala, Tewksbury, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 330 days.

(21) Appl. No.: 13/728,483

(22) Filed: Dec. 27, 2012

(51) Int. Cl.
G06F 9/54 (2006.01)
G06F 13/10 (2006.01)

(52) U.S. Cl.
CPC .............. G06F 9/542 (2013.01); G06F 13/102 (2013.01)

(58) Field of Classification Search
None
See application file for complete search history.

(56) References Cited

U.S. PATENT DOCUMENTS

| | | | |
|---|---|---|---|
| 6,904,477 B2 * | 6/2005 | Padmanabhan et al. | 710/74 |
| 7,222,348 B1 * | 5/2007 | Athreya et al. | 719/321 |
| 7,633,955 B1 | 12/2009 | Saraiya et al. | |
| 7,843,906 B1 | 11/2010 | Chidambaram et al. | |
| 7,843,907 B1 | 11/2010 | Abou-Emara et al. | |
| 7,930,583 B1 * | 4/2011 | Vemuri et al. | 714/4.1 |
| 7,990,994 B1 | 8/2011 | Yeh et al. | |
| 8,218,538 B1 | 7/2012 | Chidambaram et al. | |
| 8,520,533 B1 | 8/2013 | Gill et al. | |
| 2009/0177878 A1 * | 7/2009 | Gao et al. | 713/100 |
| 2012/0005327 A1 * | 1/2012 | Sato et al. | 709/223 |
| 2012/0197951 A1 * | 8/2012 | Abdelhadi et al. | 707/822 |

* cited by examiner

*Primary Examiner* — Umot Onat
(74) *Attorney, Agent, or Firm* — BainwoodHuang (57) ABSTRACT

A technique manages operation of a host computer having access to a storage volume on a storage system via two or more distinct paths. The technique involves operating a multipathing driver within the host computer, the multipathing driver controlling path access from the host computer to the storage volume. The technique further involves operating a host bus adaptor (HBA) driver within the host computer to interface the host computer to a fabric connecting the host computer to the storage system. The technique further involves conveying fabric topology state change event information from the HBA driver to the multipathing driver to enable the multipathing driver to take action in response to fabric topology state change events. In some arrangements, an event monitoring handler receives fabric event information from registered state change notifications (RSCNs) containing fabric event information from the HBA driver, and forwards that information on to the multipathing driver.

27 Claims, 5 Drawing Sheets

162
164(1)
Jun 11 06:41:49 libg243 kernel: qla2xxx 0000:05:00.0: LOOP DOWN detected (2 0 0).
Jun 11 06:41:49 libg243 emcp_mond: PP daemon: Info: AdapterPortEvent Callback. Event type 513, Fabric Port ID 0, Port WWN 21:00:00:24:FF:2B:83:82
Jun 11 06:42:34 libg243 kernel: rport-1:0-0: blocked FC remote port time out: saving binding
Jun 11 06:42:34 libg243 kernel: Error:Mpx:Path Bus 1 Tgt 4 Lun 10 to CF2G8102000197 is dead.
Jun 11 06:42:34 libg243 kernel: Error:Mpx:Path Bus 1 Tgt 4 Lun 3 to CF2G8102000197 is dead.
Jun 11 06:42:34 libg243 kernel: Error:Mpx:Path Bus 1 Tgt 4 Lun 0 to CF2G8102000197 is dead.

164(2)
Jun 11 06:43:40 libg243 kernel: qla2xxx 0000:05:00.0: LOOP UP detected (8 Gbps).
Jun 11 06:43:49 libg243 emcp_mond: PP daemon: Info: AdapterPortEvent Callback. Event type 512, Fabric Port ID 0, Port WWN 21:00:00:24:FF:2B:83:82
Jun 11 06:43:49 libg243 emcp_mond: PP daemon: Info: AdapterPortEvent Callback. Event type 514, Fabric Port ID 0, Port WWN 21:00:00:24:FF:2B:83:82
Jun 11 06:43:49 libg243 emcp_mond: PP daemon: Info: AdapterPortEvent Callback. Event type 512, Fabric Port ID 0, Port WWN 21:00:00:24:FF:2B:83:82
Jun 11 06:47:40 libg243 kernel: Info:Mpx:Bus 1 to VNX   CF2G8102000197 port SP A1 is alive.
Jun 11 06:47:40 libg243 kernel: Info:Mpx:Path Bus 1 Tgt 4 Lun 3 to CF2G8102000197 is alive.
Jun 11 06:47:40 libg243 kernel: Info:Mpx:Path Bus 1 Tgt 4 Lun 0 to CF2G8102000197 is alive.

164(3)
Jun 20 18:19:59 libg243 emcp_mond: PP daemon: Info: AdapterPortEvent Callback. Event type 516, Fabric Port ID 13736400, Port WWN 21:00:00:24:FF:2B:83:83
Jun 20 18:20:29 libg243 last message repeated 2 times
Jun 20 18:20:30 libg243 kernel: rport-2:0-1: blocked FC remote port time out: saving binding
Jun 20 18:20:30 libg243 kernel: Info:emcp:Path Bus 2 Tgt 1 Lun 0 pMpDevice df1f8028 array list [0 0 0] current err 12 IoCnt 12
Jun 20 18:20:30 libg243 kernel: Error:Mpx:Path Bus 2 Tgt 1 Lun 0 to HK192201049 is dead.
Jun 20 18:20:30 libg243 kernel: Error:Mpx:Path Bus 2 Tgt 1 Lun 2 to HK192201049 is dead.

164(4)
Jun 20 18:26:45 libg243 emcp_mond: PP daemon: Info: AdapterPortEvent Callback. Event type 516, Fabric Port ID 13706400, Port WWN 21:00:00:24:FF:2B:83:82
Jun 20 18:26:45 libg243 emcp_mond: PP daemon: Info: AdapterPortEvent Callback. Event type 516, Fabric Port ID 13736400, Port WWN 21:00:00:24:FF:2B:83:83
Jun 20 18:26:45 libg243 emcp_mond: PP daemon: Info: AdapterPortEvent Callback. Event type 516, Fabric Port ID 13716400, Port WWN 21:00:00:24:FF:2B:83:83
Jun 20 18:27:00 libg243 emcp_mond: PP daemon: Info: AdapterPortEvent Callback. Event type 516, Fabric Port ID 13706400, Port WWN 21:00:00:24:FF:2B:83:82

NOTIFYING A MULTIPATHING DRIVER OF FABRIC EVENTS AND PERFORMING MULTIPATHING MANAGEMENT OPERATIONS IN RESPONSE TO SUCH FABRIC EVENTS

BACKGROUND

"Multipathing" enables a host computer to direct storage commands among multiple distinct paths to a given storage volume on a data storage system. The host computer typically selects among the paths to enhance performance, e.g., for load balancing purposes, to respond to failure of a particular path, and so on. An example of a multipathing driver which enables such operation is sold under the name PowerPath® by EMC Corporation of Hopkinton, Mass.

A conventional approach to detecting path errors involves occasional path testing by the multipathing driver of the host computer. Along these lines, the multipathing driver sends small computer system interface (SCSI) commands on demand or periodically to determine which paths are healthy.

For example, suppose that a storage processor of a data storage system has temporarily gone offline for a firmware upgrade. The multipathing driver running on the host computer may periodically test a target port of the data storage system using standard commands (e.g., SCSI inquiry and SCSI Mode Sense) to determine when the target port becomes available again.

SUMMARY

Improved techniques involve notifying a multipathing driver of fabric events, and performing multipathing management operations in response to such fabric events. Such operation may be more efficient and may provide faster performance than that of a multipathing driver which performs conventional periodic path testing. Additionally, such operation enables certain activities to be performed automatically such as auto detection and configuration of target ports, auto discovery and notification of inconsistent configurations, and auto detection and management of path flakiness.

One embodiment is directed to a method of managing operation of a host computer having access to a storage volume on a storage system via two or more distinct paths. The method includes operating a multipathing driver within the host computer, the multipathing driver controlling path access from the host computer to the storage volume on the storage system. The method further includes operating a host bus adaptor (HBA) driver within the host computer to interface the host computer to a fabric connecting the host computer to the storage system. The method further includes conveying fabric topology state change event information from the HBA driver to the multipathing driver to enable the multipathing driver to take action in response to fabric topology state change events.

In some arrangements, the method includes storing and executing an event monitoring handler application by processing circuitry of the host computer to form an event monitoring handler which communicates with the multipathing driver and the HBA driver. In these arrangements, the event monitoring handler receives notification messages containing fabric event information from the HBA driver, and forwards the fabric event information on to the multipathing driver, e.g., as hints, in the form of SCSI commands, in the form of ioctl calls, etc. In certain arrangements, the information within the notification messages is gathered from registered state change notifications (RSCNs) obtained by the HBA driver. In other arrangements, such information is received using an iSCSI management application programming interface (API), i.e., via object visibility functions.

Examples of fabric events which can be reported to the multipathing driver include the addition, removal or changing of an initiator. Additional examples include transition of a port to an online or offline state, the addition of a target port, etc. Further examples include transition of a target to an online or offline state, removal of a target, and so on.

In some arrangements, communications between the event monitoring handler and the HBA driver are via a standardized HBA API. In these arrangements, the event monitoring handler takes the form of a daemon operating in user space while the multipathing driver and the HBA driver operate in kernel space. The HBA API takes the form of library which operates as an interface between the event monitoring handler and the HBA driver (including any vendor specific libraries).

Accordingly, the fabric topology state change event information passes from the HBA driver to the daemon and then to the multipathing driver. As a result, there is HBA API integration with the multipathing driver.

Other embodiments are directed to electronic systems and apparatus, processing circuits, computer program products, and so on. Some embodiments are directed to various processes, electronic components and circuitry which involve notifying a multipathing driver of fabric events.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is an example of fabric event information which is conveyed from an HBA driver to a multipathing driver via HBA API integration.

DETAILED DESCRIPTION

An improved technique involves notifying a multipathing driver of fabric events, and performing multipathing management operations in response to such fabric events. Such operation may be more efficient and may provide faster performance than that of a conventional periodic path testing approach. Furthermore, such operation enables certain activities to be performed automatically such as auto detection and configuration of target ports, auto discovery and notification of inconsistent configurations, and auto detection and management of path flakiness.

Figure 1:
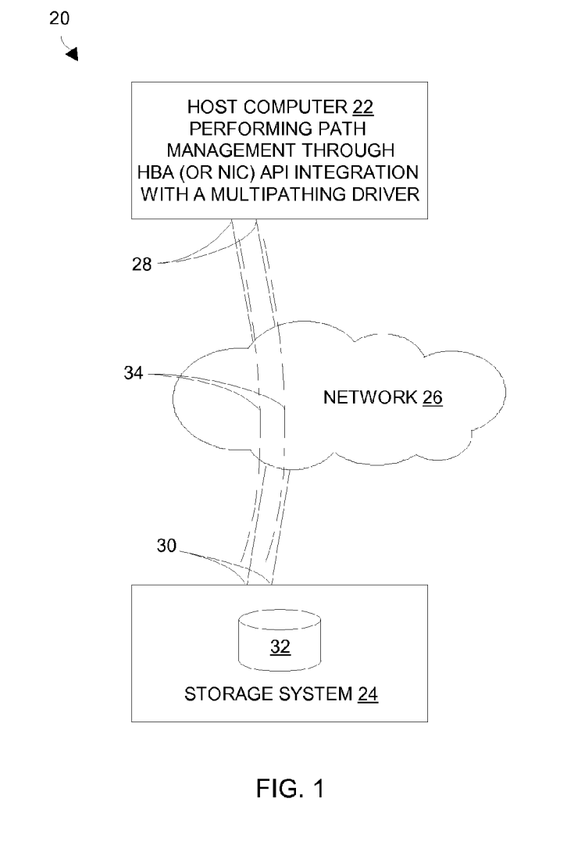
FIG. 1 is a block diagram of a data processing system in which a multipathing driver is capable of receiving notification of fabric events via HBA API integration, and performing multipathing management operations in response to such fabric events.

FIG. 1 is a block diagram of a data processing system 20 within which a multipathing driver receives notification of fabric events via HBA API integration, and performs multipathing management operations in response to such fabric events. The data processing system 20 includes a host computer 22, a storage system 24, and a storage interconnection network 26. In general, both the host computer 22 and the storage system 24 have multiple connections to the network 26 via multiple ports, respective ports 28, 30 being shown for simplicity. An end-to-end connection between a host port 28 and storage system port 30 may be referred to herein as a "bus" for carrying storage commands and data. The storage system 24 presents to the host computer 22 one or more addressable units of storage referred to as "volumes" or "LUNs" 32 ("LUN" referring in a strict sense to SCSI logical unit number, but generally used to refer to the logical unit of storage itself).

"Storage system" refers to one or more manufactured assemblies providing access to associated physical storage. Each assembly might contain physical storage elements such as flash drives and/or disk drives, or in some cases there may be some assemblies that serve as a front-end to associated physical storage residing on one or more separate back-end assemblies. One type of storage system, referred to as an "array", has a collection of storage elements along with control circuitry providing host interface(s) and other functions. An example of such an array is a SAN- or NAS-based system sold under the name VNX™ by EMC Corporation. An example of an appliance serving as a front-end to separate back-end physical storage is a storage controller appliance sold under the name VPLEX™ by EMC Corporation.

As further shown in FIG. 1, multiple paths 34 extend between the host computer 22 and the LUN 32. A path 34 in the present context may be a so-called I-T-L nexus, referring to a particular Initiator port (host port 28), Target port (storage system port 30) and LUN (LUN 32). The paths 34 are distinct in that they have different host ports 28 and storage system ports 30. In general, the host computer 22 can conduct storage input/output (IO) operations involving the LUN 32 via any of the paths 34.

It should be understood that FIG. 1 depicts a simplified data processing system 20 for purposes of description. In actual implementation, the data processing system 20 may resemble FIG. 1 or may be more extensive and complex. For example, the data processing system 20 may have multiple host computers 22 and multiple storage systems 24. Additionally, the data processing system 20 may employ a complex set of network elements to realize the network 26 (e.g., cables, switches, etc.). In some arrangements, a LUN 32 may be accessible at multiple physical locations via distinct storage assemblies, buses and paths. Moreover, in a real system there will typically be a number of different LUNs 32 accessible to the host computer 22.

Figure 2:
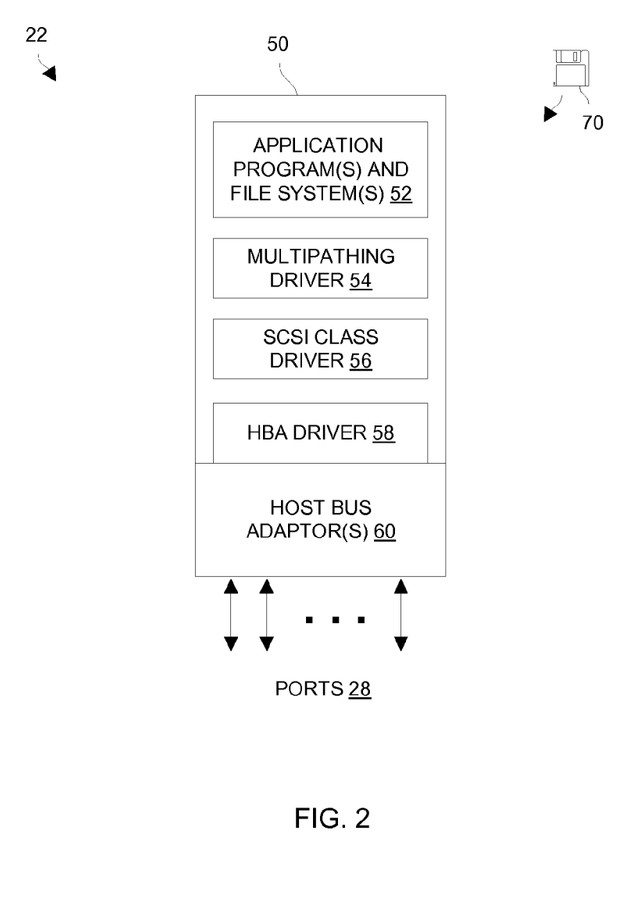
FIG. 2 is a block diagram of a host computer of the data processing system of FIG. 1.

FIG. 2 shows pertinent structure and organization of the host computer 22. It will be appreciated that from a hardware perspective the host computer 22 is an electronic apparatus which includes processing circuitry 50 such as one or more processors, memory, and IO circuitry along with internal data bus(es) interconnecting these components (not shown in FIG. 2). The processing circuitry 50 stores and executes computer instructions that form various programs, routines, etc., including an operating system and one or more application programs for example. FIG. 2 illustrates executing application program(s) (generally in user space) and file system(s) (F/S) 52 (generally in kernel) as well as an executing multipathing driver 54, an executing SCSI class driver 56, and an executing HBA driver 58 which are used in the processing of storage IO operations. In some systems, the SCSI class driver 56 is disposed between the multipathing driver 54 and the HBA driver 58. In other systems, the SCSI class driver 56 is above the multipathing driver 56.

The host computer 22 also includes a host bus adapter(s) or HBA(s) 60 which include(s) hardware circuitry that interfaces the host computer 22 to the network 26 via the HBA driver 58 (also see FIG. 1). The host computer 22 may have one or more HBAs 60, and each HBA 60 may have one or more ports 28.

The multipathing driver 54 typically forms part of an operating system of the host computer 22. In particular, the multipathing driver 54 forms part of a set of drivers that together process the storage I/O commands from the applications and file system 52 directed to the storage system 24. In such an arrangement, the multipathing driver 54 may be realized as a so-called "filter" driver that performs special processing for storage IO commands. In this context, the term "multipathing" refers to the process of identifying, using and managing the various paths 34 to storage volumes (e.g., paths 34 to volume/LUN 32) to effect system goals while hiding details of these operations from the application (s) and file system 52. Such system goals may include performance goals (from the use of parallel operations over multiple paths 34), availability goals (from the use of redundancy and fail-over techniques), and so on.

It should be understood that the HBA driver may refer to a vendor HBA driver which operates vendor HBA hardware. For the purposes of this discussion, the HBA driver may further include one or more vendor HBA libraries to enable a common HBA API to invoke various functions in the HBA driver. As will be explained in further detail shortly, an event monitoring handler is able to link with this HBA API in order to obtain access to fabric event information available from the HBA driver, and then convey that fabric event information to the multipathing driver.

It should be further understood that the processing circuitry 50 can be implemented in a variety of ways including via memory and one or more processors running specialized software stored in the memory. The processing circuitry 50 may include hardware such as application specific ICs (ASICs), field programmable gate arrays (FPGAs) and associated programs, discrete components, analog circuits, combinations thereof, and so on. In the context of one or more processors running specialized software, a computer program product 70 is capable of delivering all or portions of the software to the host computer 22. The computer program product 70 has a non-transitory (or non-volatile) computer readable medium which stores a set of instructions which controls one or more operations of the host computer 22. Examples of suitable computer readable storage media include tangible articles of manufacture and apparatus which store instructions in a non-volatile manner such as CD-ROM, flash memory, disk memory, tape memory, and the like.

Figure 3:
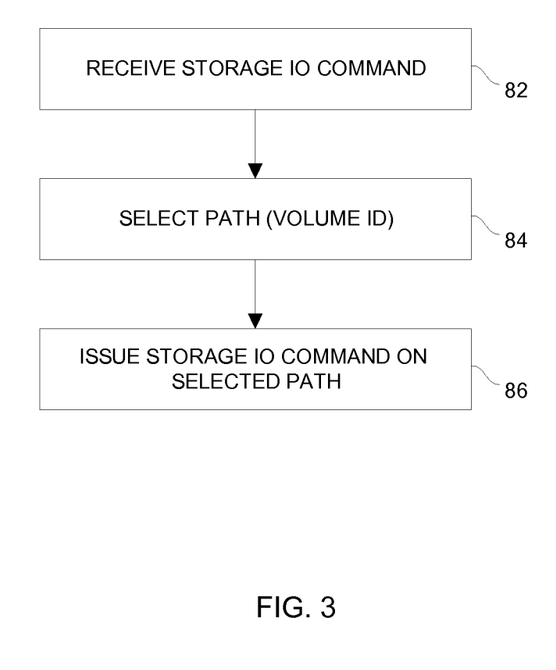
FIG. 3 is a flow diagram for processing of a storage I/O command by the host computer of FIG. 2.

FIG. 3 shows the basic operation of the multipathing driver 54 when processing a storage IO command (also see FIGS. 1 and 2). As will be explained in further detail shortly, such operation may be based on notification of fabric events such as the addition or removal of initiators or targets, the online or offline transition of an initiator port or target port, and so on. It should be understood that such fabric events may include events to which the multipathing driver 54 has no visibility such as switch port events, inter-switch link (ISL) events, and events relating to other elements of the fabric. Furthermore, the multipathing software which includes the multipathing driver 54 as well as additional multipathing code outside the driver (e.g., user space multipathing utilities) are capable of performing additional operations in response to notification of these fabric events (e.g., automatically performing bus scans and other activities, notifying a user of an inconsistent configuration, detecting flakiness in various components of the fabric, etc.).

At 82, the multipathing driver 54 receives the storage IO command (such as a SCSI read or SCSI write command) for a storage operation being performed by the application(s) or F/S 52 (FIG. 2). The storage IO command will typically be included in an IO command block passed from a higher level component of the operating system to the multipathing driver 54, as generally known in the art. The storage IO command will include, among other things, an identification of the volume 32 to which the storage operation is directed (FIG. 1).

At 84, the multipathing driver 54 selects a path 34 that is to be used for the storage IO command, based on the identification (i.e., VOLUME ID) of the volume 32. Such path selection provides load balancing across multiple available paths 34 to the volume 32, as well as continued availability of the volume 32 in the event of failure of a particular path 34. Furthermore, such path selection may be based on fabric topology awareness gathered via HBA API integration, e.g., which ports are online, which devices have been removed, and so on.

At 86, the multipathing driver 54 issues the storage IO command on the selected path 34. Again referring to the volume 32 of FIG. 1, the IO command will be sent to the storage system 24 via a selected one of the paths 34. The selected path 34 will also be used for the data transfer associated with the IO command, as well as the eventual response indicating completion of the IO command, as generally known in the art.

Figure 4:
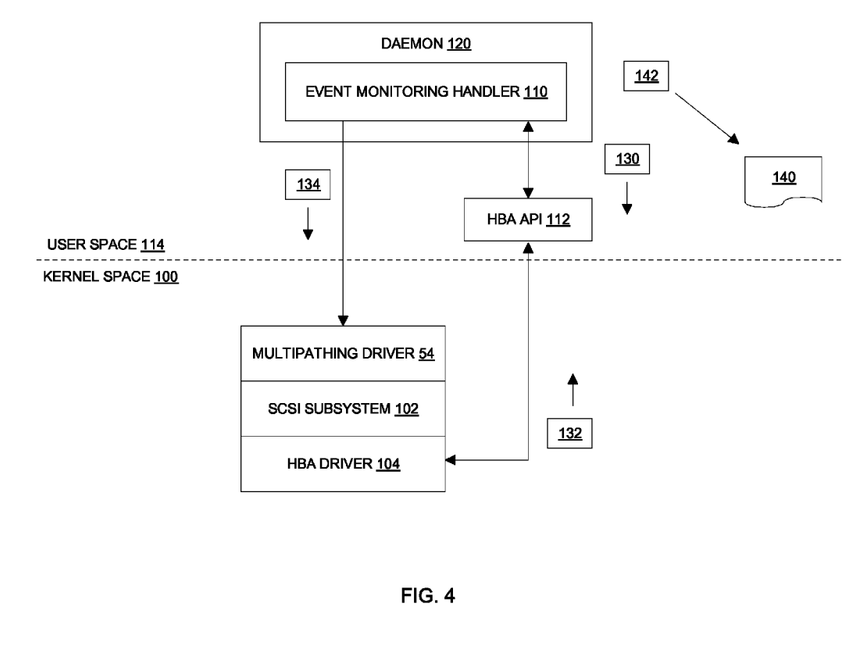
FIG. 4 is a block diagram of various host computer components which operate to achieve HBA API integration.

FIG. 4 shows various components of the host computer 22 which operate to achieve HBA API integration. This arrangement is a possible architecture which enables the multipathing driver 54 to obtain information regarding fabric events and then take appropriate action.

As shown in FIG. 4, the multipathing driver 54 operates in kernel space 100 along with the SCSI subsystem 102 and HBA driver 104. As mentioned earlier, the HBA driver 104 may represent a vendor HBA driver in combination with a vendor HBA library to provide HBA functionality on particular vendor HBA hardware. As also mentioned earlier, the SCSI subsystem 102 may reside above the multipathing driver 54 rather than between the multipathing driver 54 and the HBA driver 104.

As further shown in FIG. 4, an event monitoring handler 110 and an HBA API 112 reside in user space 114. In some arrangements, the HBA API 112 is provided as a common HBA API library. In particular, the HBA API 112 may take the form of a single C-style library interface which enables any SAN management application to link to the HBA API 112 and thus access any of multiple of vendor-specific HBA libraries and drivers. Suitable standards include, among others, the SNIA Common HBA API which is an industry standard "C" language API for management of Fibre Channel HBAs and discovery of SAN resources, and the iSCSI Management API which defines a standard interface that applications can use to perform iSCSI management independent of the vendor of the iSCSI HBA. In connection with iSCSI, a network driver and networking circuitry (e.g., a network interface card or NIC) are in place of the HBA driver and the HBA (also see FIG. 2) to enable an initiator to process IOs over a computer network.

As illustrated by the various arrows in FIG. 4 showing directions of various communications among particular components, the event monitoring handler 110 is constructed and arranged to communicate directly with the multipathing driver 54, and further with the HBA driver 104 via the HBA API 112. As such, the event monitoring handler 110 is able to relay fabric events from the HBA driver 104 to the multipathing driver 54. Upon receipt of these fabric events, the multipathing driver 54 is able to perform multipathing management activities.

One possible implementation for the event monitoring handler 110 is for a daemon process of the host computer 22 to execute an event monitoring handler program (e.g., also see the applications and F/S 24 in FIG. 2) to form a daemon 120 having the event monitoring handler 110. Further details of how the event monitoring handler 110 conveys fabric event information to the multipathing driver 54 from the HBA driver 104 will now be provided.

Initially, the event monitoring handler 110 communicates with the HBA driver 104 (also see the HBA 60 in FIG. 2). That is, the event monitoring handler 110 first registers with the HBA driver 104 (see block 130 in FIG. 4) so that the HBA driver 104 will notify the event monitoring handler 110 of future fabric events.

Once the event monitoring handler 110 has properly registered with the HBA driver 104, fabric state changes observed by the HBA driver 104 are reported from the HBA driver 104 to the event monitoring handler 110 via notification messages 132 (block 132 in FIG. 4). These notification messages 132 may include fabric event information from registered state change notifications (RSCNs) which are based on the Fibre Channel protocol. In other arrangements, these notification messages 132 may include similar fabric event information obtained via iSCSI management API object visibility functions. One will appreciate that, by registering with the HBA driver 104, the event monitoring handler 110 is now able to monitor a variety of fabric events obtained by the HBA driver 104 from other fabric components. Accordingly, the event monitoring handler 110 is privy to an assortment of fabric topology state change events.

Upon receipt of each notification message 132 containing fabric topology state change event information from the HBA driver 104, the event monitoring handler 110 conveys that information to the multipathing driver 54 (see block 134 in FIG. 4). The multipathing driver 54 is then able to take appropriate action in response to fabric topology state change events.

It should be understood that the formats for the various communications 130, 132, and 134 may be different. Along these lines, the communication 132 may take any form suitable for including fabric event information gathered from the HBA driver 104. Furthermore, the communication 134 from the event monitoring handler 110 may take a different form and/or comply with a different protocol in order to be processed by the multipathing driver 54 (e.g., hints or special SCSI commands, ioctl commands, and so on).

In some arrangements, the event monitoring handler 110 is constructed and arranged to log fabric topology state change events into an event logging facility 140 (e.g., a database, a file, etc.). In particular, the event monitoring handler 110 writes each fabric event, perhaps with additional information such as current state data, time information, configuration information, etc. to the facility 140 (see block 142 in FIG. 4). This recorded information may be further processed (e.g., for error analysis) and/or archived.

FIG. 5 shows an example output 160 of fabric event information which is conveyed from the HBA driver 104 to the multipathing driver 54. The example output 160 includes a series of event notifications 162, i.e., fabric event information provided by the HBA driver 104 (also see the block 132 in FIG. 4). Each event notification 162 may include particular event details such as a timestamp, port identification information, event type information, and so on.

It should be understood that the event monitoring handler 110 may process this fabric event information prior to sending it to the multipathing driver 54. For example, if many events relate to the same fabric entity from the perspective of the multipathing driver 54, the event monitoring handler 110 may send a summary or sample event to the multipathing driver 54. Such processing by the event monitoring handler 110 may prevent the multipathing driver 54 from spending too much time handling these events which could otherwise disrupt performance.

By way of example, some event notifications 162 include event types 164(1), 164(2), ... (collectively, event types 164) containing event codes which along with the additional event details and the context of earlier event notifications 162 can identify particular fabric events.

For example, event type 164(1) (i.e., "Event Type 513") identifies an HBA_EVENT_PORT_OFFLINE fabric event. That is, the HBA driver 104 notifies the event monitoring handler 110 of this fabric event which, in turn, conveys the fabric event to the multipathing driver 54 (also see FIG. 4). Such a fabric event may occur when a port is disabled from a switch.

Additionally, event type 164(2) (i.e., "Event Type 514") identifies an HBA_EVENT_PORT_ONLINE fabric event. Such a fabric event may occur when a port is enabled from a switch.

Furthermore, event type 164(3) (i.e., "Event Type 516") identifies an HBA_EVENT_PORT_FABRIC fabric event. Such a fabric event may occur when an array port is disabled from a switch.

Likewise, event type 164(4) (i.e., "Event Type 516") identifies another HBA_EVENT_PORT_FABRIC fabric event. Such a fabric event may occur when a storage processor of an array is rebooted.

It should be understood that the above-described infrastructure is capable of handling a robust set of fabric events such as HBA-related events, port-related events, target-related events, link-related events, and so on. Table 1 provides a listing of some example event notifications 162 that map to particular fabric events.

TABLE 1

| Event Code | Description |
| --- | --- |
| 256 (0x100) | HBA_EVENT_ADAPTER_UNKNOWN |
| 258 (0x102) | HBA_EVENT_ADAPTER_REMOVE |
| 259 (0x103) | HBA_EVENT_ADAPTER_CHANGE |
| 512 (0x200) | HBA_EVENT_PORT_UNKNOWN |
| 513 (0x201) | HBA_EVENT_PORT_OFFLINE |
| 514 (0x202) | HBA_EVENT_PORT_ONLINE |
| 515 (0x203) | HBA_EVENT_PORT_NEW_TARGETS |
| 516 (0x204) | HBA_EVENT_PORT_FABRIC |
| 1024 (0x400) | HBA_EVENT_TARGET_UNKNOWN |
| 1025 (0x401) | HBA_EVENT_TARGET_OFFLINE |
| 1026 (0x402) | HBA_EVENT_TARGET_ONLINE |
| 1027 (0x403) | HBA_EVENT_TARGET_REMOVED |
| 1280 (0x500) | HBA_EVENT_LINK_UNKNOWN |
| 1281 (0x501) | HBA_EVENT_LINK_INCIDENT |

TABLE 1-continued

| Event Code | Description |
| --- | --- |
| . | . |
| . | . |
| . | . |

Other event notifications 162 are suitable for use as well.

The following are few example multipathing management activities which can be performed by the multipathing driver 54 (FIG. 4) in response to notification of one or more fabric events. It should be understood that other situations and examples are contemplated as well.

Example 1

Suppose that a service processor has rebooted, a storage processor hangs, or portions of a data storage array perform a firmware upgrade. Traditionally, the multipathing driver polls using standard commands such as SCSI inquiry commands and Mode Sense commands to determine when the associated target port(s) has come back alive.

However, with the above-described HBA API integration in which the multipathing driver 54 receives notifications of fabric events, the multipathing driver 54 is able to receive fabric notifications in response to target port state changes. Accordingly, paths through previously offline target ports are restored more quickly.

Example 2

Suppose that new target ports are added to the system. On some conventional platforms, an administrator manually initiates a bus scan followed by other commands to bring the new target ports under control of the multipathing driver.

However, with the above-described HBA API integration, the multipathing driver 54, or multipathing code running in user space (see the daemon 120 in FIG. 4), is able to automatically perform a bus scan and other commands in response to the detection of new target ports. Along these lines, the multipathing driver 54 is able to automatically detect and configure LUNs 32 (FIG. 1) exported from the target ports 30.

Such operation is useful when target ports 30 are taken offline for maintenance and subsequently added back, as well as other situations. With such auto detection of online and offline status of the target ports 30, the host computer 22 is able to automatically respond upon receiving notification of the associated fabric events (e.g., quickly mark paths alive or dead to prevent further IO failures, configure new storage, etc.).

Example 3

With HBA API integration, particular HBA attributes can be read and evaluated by the multipathing driver 54 or the daemon 110 (FIG. 4). In particular, attributes such as port speed, frame size, world wide number (WWN), driver version and so on, can be accessed and analyzed.

If an inconsistent or unsupported configuration is discovered, an alert (e.g., from the daemon 120) can be provided to the user. For instance, the user may be alerted that certain migration operations are prohibited if port characteristics of multiple IO paths used in the migration do not match. For instance, the HBA API can be used to check that the parameters of the HBA(s) that the source connects through match those parameters for the HBA(s) the migration destination connects through. If the source accepts larger IOs than the destination, the migration might fail if one of the large IOs is processed as a write that has to go to both sides.

Also, the attributes can be used to uniquely tag an initiator port 28 (FIG. 1) so that certain information can be connected to information coming from other sources. Such information may include performance metrics collected over the path 34 or the bus, as well as other data.

Example 4

Using notifications of fabric events, the multipathing driver 54 is able to detect intermittent errors where IOs are succeeding, at least part of the time. Along these lines, the multipathing driver 54 is able to identify the number of port errors that occur during a specific time frame. If the number of port errors exceeds a predefined threshold, the multipathing driver 54 is able to take appropriate actions. For example, the multipathing driver 54 may move a path 34 from an active mode to a standby mode resulting in future IO commands to be routed only through active paths 34. Suitable techniques involving management of path operating modes are described in U.S. patent application Ser. No. 13/535,752, the contents and teachings of which are hereby incorporated by reference in their entirety.

Such operation improves performance (e.g., latency, resource consumption, etc.) since there will be less retries. Furthermore, such operation is an efficient and effective alternative to determining flakiness in the fabric. In particular, such operation alleviates the need for the multipathing driver 54 to count and track errors per IO to detect path flakiness.

As described above, improved techniques involve notifying a multipathing driver 54 of fabric events, and performing multipathing management operations in response to such fabric events. Such operation may be more efficient and may provide faster performance than that of a multipathing driver 54 which performs conventional periodic path testing. Additionally, such operation enables certain activities to be performed automatically such as auto detection and configuration of target ports, auto discovery and notification of inconsistent configurations, and auto detection and management of path flakiness.

While various embodiments of the present disclosure have been particularly shown and described, it will be understood by those skilled in the art that various changes in form and details may be made therein without departing from the spirit and scope of the present disclosure as defined by the appended claims.

For example, as mentioned above, in iSCSI arrangements, a network driver and networking circuitry are in place of the HBA driver and the HBA to enable an initiator to process IOs over a computer network. In these arrangements, fabric event information is received using an iSCSI management application programming interface (API), i.e., via object visibility functions. Such modifications and enhancements are intended to belong to various embodiments of this disclosure.

What is claimed is:

1. A method of managing operation of a host computer having access to a storage volume on a storage system via two or more distinct paths, the method comprising:
   operating a multipathing driver within the host computer, the multipathing driver controlling path access from the host computer to the storage volume on the storage system;
   operating a host bus adaptor (HBA) driver within the host computer to interface the host computer to a fabric connecting the host computer to the storage system;
   conveying fabric topology state change event information from the HBA driver to the multipathing driver to enable the multipathing driver to take action in response to fabric topology state change events; and
   storing and executing an event monitoring handler application by processing circuitry of the host computer to form, as a daemon which operates separately from the multipathing driver and the HBA driver, an event monitoring handler which communicates with the multipathing driver and the HBA driver to convey the fabric topology state change event information from the HBA driver to the multipathing driver,
   wherein, prior to performing a migration operation that would redirect storage requests from a first HBA to a second HBA, the method further comprises:
      reading, by the event monitoring handler, a first set of HBA attributes from the first HBA adapter;
      reading, by the event monitoring handler, a second set of HBA attributes from the second HBA adapter;
      performing a comparison operation, the comparison operation constructed and arranged to generate a comparison result indicating (i) a match when the first set of HBA attributes matches the second set of HBA attributes and (ii) a mismatch when the first set of HBA attributes does not match the second set of HBA attributes; and
      issuing an alert to a user of the storage system in response to the comparison result indicating the mismatch, the alert indicating a potential migration failure.

2. The method as in claim 1 wherein conveying the fabric topology state change event information from the HBA driver to the multipathing driver includes:
   receiving, by the event monitoring handler, a notification message from the HBA driver, the notification message identifying a fabric topology state change event detected by the HBA driver, and
   sending, by the event monitoring handler, a multipathing driver message to the multipathing driver in response to the notification message, the multipathing driver message informing the multipathing driver of the fabric topology state change event.

3. The method as in claim 2 wherein storing and executing the event monitoring handler application to form the event monitoring handler includes:
   exchanging communications between the event monitoring handler and the HBA driver via a standardized HBA application programming interface (API).

4. The method as in claim 3 wherein operating the multipathing driver and the HBA driver occur in kernel space; and
   wherein storing and executing the event monitoring handler application to form the event monitoring handler occurs in user space which is less privileged than the kernel space.

5. The method as in claim 2 wherein receiving the notification message from the HBA driver includes:
   obtaining, as the notification message, fabric event information from a registered state change notification (RSCN) from the HBA driver.

6. The method as in claim 5, further comprising:
   performing a multipathing management operation in response to the multipathing driver message sent from the event monitoring handler to the multipathing driver.

7. The method as in claim 6 wherein performing the multipathing management operation includes:
   automatically initiating a bus scan in response to the multipathing driver message sent from the event monitoring handler to the multipathing driver.

8. The method as in claim 7, further comprising:
   after completion of the bus scan, automatically bringing a set of target devices under control of the multipathing driver.

9. The method as in claim 6 wherein performing the multipathing management operation includes:
   monitoring a number of port errors occurring within a specific timeframe to identify whether a component in the fabric is intermittent.

10. The method as in claim 6 wherein performing the multipathing management operation includes:
    transitioning a particular path between an active mode and a standby mode.

11. The method as in claim 6 wherein performing the multipathing management operation includes:
    transitioning a particular path between a healthy state and an unhealthy state.

12. The method as in claim 5 wherein obtaining the fabric event information from the RSCN from the HBA driver includes:
    acquiring a notification indicating that a component has transitioned to an offline state, the multipathing driver being configured to automatically perform an appropriate action in response that notification.

13. The method as in claim 5 wherein obtaining the fabric event information from the RSCN from the HBA driver includes:
    acquiring a notification indicating that a component has transitioned to an online state, the multipathing driver being configured to automatically perform an appropriate action in response that notification.

14. The method as in claim 5, further comprising:
    prior to obtaining the fabric event information from the RSCN from the HBA driver, registering the event monitoring handler to receive the fabric event information.

15. The method as in claim 14 wherein a small computer system interface (SCSI) class driver is disposed between the multipathing driver and the HBA driver; and wherein conveying the fabric topology state change event information from the HBA driver to the multipathing driver includes:
    communicating the fabric topology state change event information through the event monitoring handler in a manner which circumvents the SCSI class driver.

16. The method as in claim 2 wherein executing the event monitoring handler application as the daemon background process includes:
    logging the fabric topology state change event in an event logging facility of the host computer.

17. The method as in claim 1 wherein the HBA driver resides in kernel space; and wherein the method further comprises:
    performing, by the event monitoring handler while the event monitoring handler resides in user space which is less privileged than kernel space, a registration operation which directs the HBA driver to notify the event monitoring handler of fabric events, the HBA driver not notifying the event monitoring handler of fabric events prior to performance of the registration operation, and the HBA driver communicating directly with the event monitoring handler via a HBA interface to notify the event monitoring handler of fabric events after performance of the registration operation.

18. The method as in claim 1 wherein storing and executing the event monitoring handler application to form the event monitoring handler includes:
    processing at least a portion of the fabric topology state change event information within the event monitoring handler and out of band from the multipathing driver to prevent the fabric topology state change event information from disrupting performance of the multipathing driver, the processing including generating, by the event monitoring handler, at least one of (i) summary information that describes multiple events and (ii) a sample event that is representative of multiple events.

19. The method as in claim 1, wherein the comparison operation is constructed and arranged to generate a comparison result indicating the mismatch when port characteristics of the first HBA do not match port characteristics of the second HBA.

20. The method as in claim 19, the mismatch is generated when the first HBA accepts larger IOs (Input/Outputs) than does the second HBA.

21. The method of claim 1, wherein the migration operation is from a source to a destination, wherein the first HBA connects to the source, and wherein the second HBA connects to the destination.

22. The method of claim 21, further comprising directing a write both to the source through the first HBA and to the destination through the second HBA.

23. A computer program product having a non-transitory computer readable medium which stores a set of instructions to manage operation of a host computer having access to a storage volume on a storage system via two or more distinct paths, the set of instructions, when carried out by the host computer, causing the host computer to perform a method of:
    operate a multipathing driver within the host computer, the multipathing driver controlling path access from the host computer to the storage volume on the storage system;
    operate a host bus adaptor (HBA) driver within the host computer to interface the host computer to a fabric connecting the host computer to the storage system;
    convey fabric topology state change event information from the HBA driver to the multipathing driver to enable the multipathing driver to take action in response to fabric topology state change events; and
    storing and executing an event monitoring handler application to form, as a daemon which operates separately from the multipathing driver and the HBA driver, an event monitoring handler which communicates with the multipathing driver and the HBA driver to convey the fabric topology state chance event information from the HBA driver to the multipathing driver,
    wherein, prior to performing a migration operation that would redirect storage requests from a first HBA to a second HBA, the method further comprises:
      reading, by the event monitoring handler, a first set of HBA attributes from the first HBA adapter;
      reading, by the event monitoring handler, a second set of HBA attributes from the second HBA adapter;
      performing a comparison operation, the comparison operation constructed and arranged to generate a comparison result indicating (i) a match when the first set of HBA attributes matches the second set of HBA attributes and (ii) a mismatch when the first set of HBA attributes does not match the second set of HBA attributes; and issuing an alert to a user of the storage system in response to the comparison result indicating the mismatch, the alert indicating a potential migration failure.

24. The computer program product as in claim 23 wherein conveying the fabric topology state change event information from the HBA driver to the multipathing driver includes:

receiving, by the event monitoring handler, a notification message from the HBA driver, the notification message identifying a fabric topology state change event detected by the HBA driver, and sending, by the event monitoring handler, a multipathing driver message to the multipathing driver in response to the notification message, the multipathing driver message informing the multipathing driver of the fabric topology state change event.

25. A host computer, comprising:

a set of host bus adaptors (HBAs) to access to a storage volume on a storage system via two or more distinct paths;

a set of processors coupled to the set of HBAs; and memory coupled to the set of processors, the memory storing executable instructions which, when executed by the set of processors, cause the set of processors to:

operate a multipathing driver within the host computer, the multipathing driver controlling path access from the host computer to the storage volume on the storage system, operate a HBA driver within the host computer to interface the host computer to a fabric connecting the host computer to the storage system, convey fabric topology state change event information from the HBA driver to the multipathing driver to enable the multipathing driver to take action in response to fabric topology state change events; and store and execute an event monitoring handler application to form, as a daemon which operates separately from the multipathing driver and the HBA driver, an event monitoring handler which communicates with the multipathing driver and the HBA driver to convey the fabric topology state change event information from the HBA driver to the multipathing driver, wherein, prior to a migration operation that would redirect storage requests from a first HBA of the set of HBAs to a second HBA of the set of HBAs, the executable instructions further cause the set of processors to:

read, by the event monitoring handler, a first set of HBA attributes from the first HBA adapter;

read, by the event monitoring handler, a second set of HBA attributes from the second HBA adapter;

perform a comparison operation, the comparison operation constructed and arranged to generate a comparison result indicating (i) a match when the first set of HBA attributes matches the second set of HBA attributes and (ii) a mismatch when the first set of HBA attributes does not match the second set of HBA attributes; and issue an alert to a user of the storage system in response to the comparison result indicating the mismatch, the alert indicating a potential migration failure.

26. The host computer as in claim 25 wherein the set of processors, when conveying the fabric topology state change event information from the HBA driver to the multipathing driver, is constructed and arranged to:

while forming the event monitoring handler, (i) receive a notification message from the HBA driver, the notification message identifying a fabric topology state change event detected by the HBA driver, and (ii) send a multipathing driver message to the multipathing driver in response to the notification message, the multipathing driver message informing the multipathing driver of the fabric topology state change event.

27. A method of managing operation of a host computer having access to a storage volume on a storage system via two or more distinct paths, the method comprising:

operating a multipathing driver within the host computer, the multipathing driver controlling path access from the host computer to the storage volume on the storage system;

operating a host bus adaptor (HBA) driver within the host computer to interface the host computer to a fabric connecting the host computer to the storage system;

conveying fabric topology state change event information from the HBA driver to the multipathing driver to enable the multipathing driver to take action in response to fabric topology state change events;

storing and executing an event monitoring handler daemon by processing circuitry of the host computer, the event monitoring handler daemon communicating with the multipathing driver and the HBA driver to convey the fabric topology state change event information from the HBA driver to the multipathing driver, wherein, prior to performing a migration operation that would redirect storage requests form a first HBA to a second HBA, the method further comprises:

reading, by the event monitoring handler daemon, a first set of HBA attributes from the first HBA;

reading, by the event monitoring handler daemon, a second set of HBA attributes from the second HBA;

performing a comparison operation, the comparison operation constructed and arranged to generate a comparison result indicating (i) a match when the first set of HBA attributes matches the second set of HBA attributes and (ii) a mismatch when the first set of HBA attributes does not match the second set of HBA attributes; and issuing an alert to a user of the storage system in response to the comparison result indicating the mismatch, the alert indicating a potential migration failure.

* * * * *